United States Patent Office 3,349,618
Patented Oct. 31, 1967

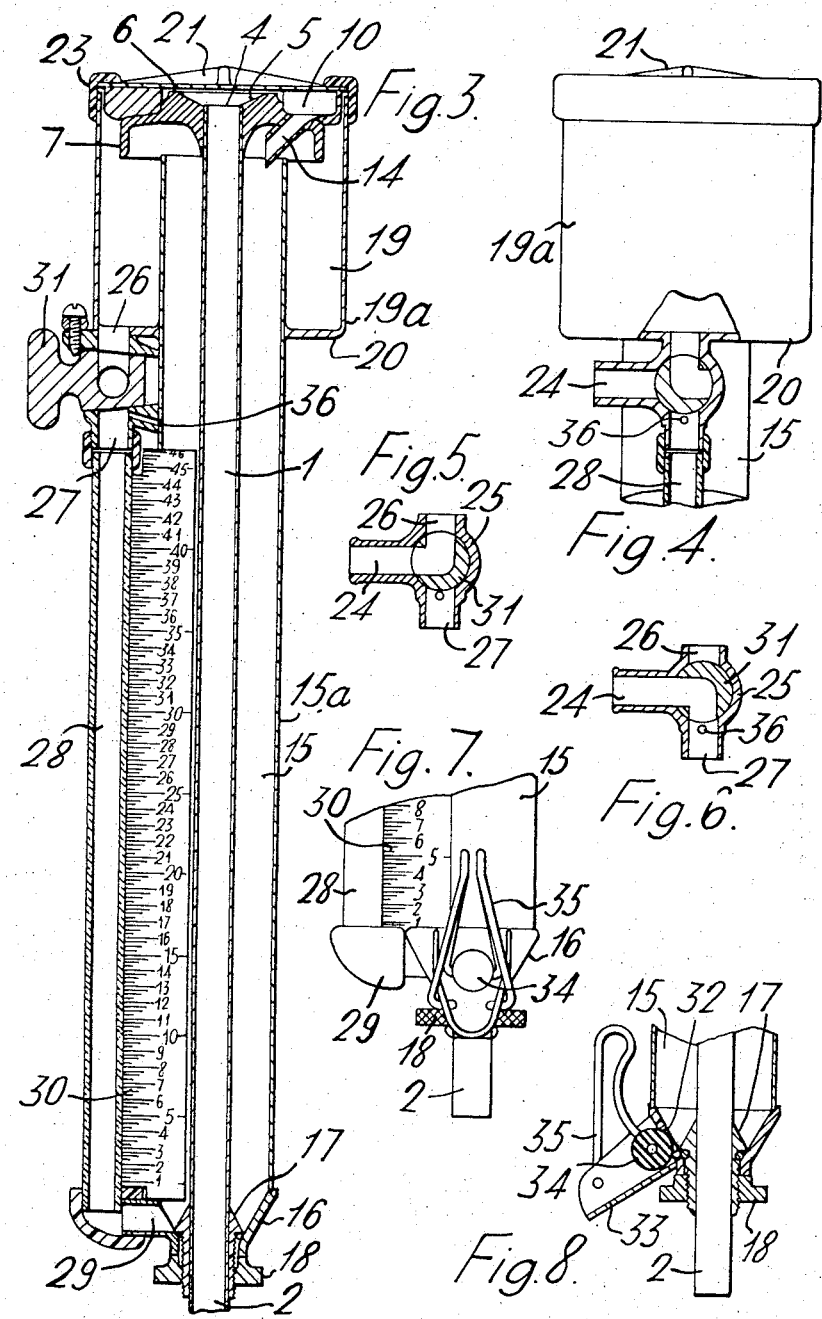

3,349,618
APPARATUS FOR USE WITH MILKING MACHINES FOR MEASURING AND INDICATING THE MILK YIELD
Charles W. Maxwell, Leith Road, Okato, North Plymouth, New Zealand
Filed June 1, 1965, Ser. No. 460,421
Claims priority, application New Zealand, June 8, 1964, 138,126
3 Claims. (Cl. 73—202)

ABSTRACT OF THE DISCLOSURE

Apparatus for measuring and indicating a cow's milk yield wherein a conduit connectable to the supply has an outlet and members cooperable therewith defining an opening through which milk jets as an annular disc. A fractional part thereof collects in a passageway providing a volume substantially proportional to the total volume, with such collected flow being received in a sample chamber for indicating the total volume. The remaining flow collects in a chamber having an outlet connectable to a milk line, discharges the milk during milking and the sample chamber outlet discharges the milk before use for measuring another cow's yield.

---

This invention relates to apparatus for use with milking machines for measuring and indicating the milk yield of a cow.

To enable a herd of diary cows to be improved and tested, it is desirable to be able to easily and accurately record the yield of the individual members of the herd. Because of the fluctuating flow of milk, the quantity of air contained therewith and various other factors it has been difficult to obtain a flow of milk from which a proportional sample may be removed for measuring purposes.

It is an object of the present invention to provide apparatus for use with milking machines which will form a fluctuating but at any instant a substantially uniform flow of milk so that a collected fractional part of that milk will represent a volume of milk substantially proportional to the total volume of milk flowing during the measuring process.

It is a further object of this invention to collect the proportional volume of milk in a calibrated chamber so that the sample may be used to indicate the total volume of milk flowing during the measuring process.

It is a further object of the invention to allow a sample of milk to be taken for testing purposes once the volumetric reading has been completed.

Figure 1:
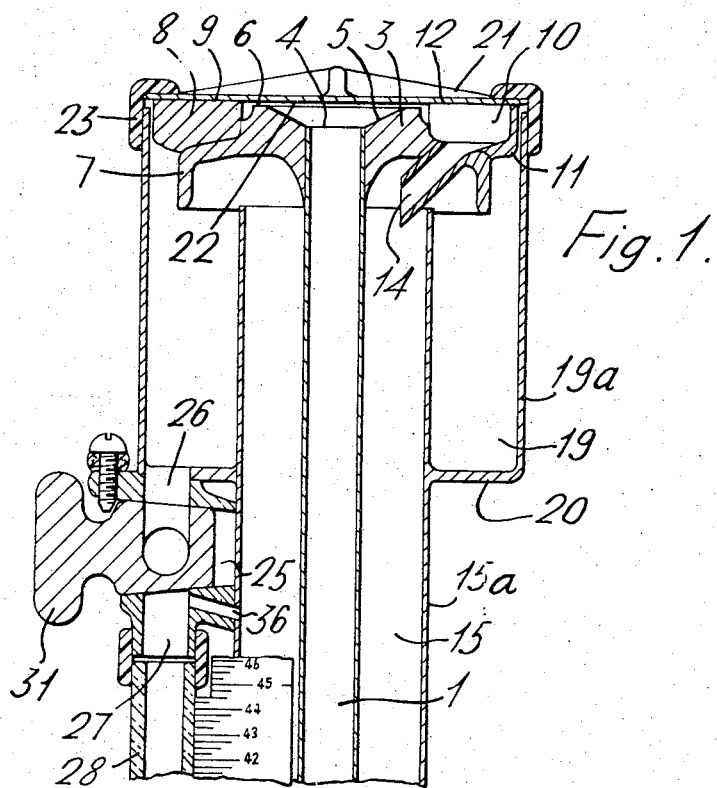
Figure 2:
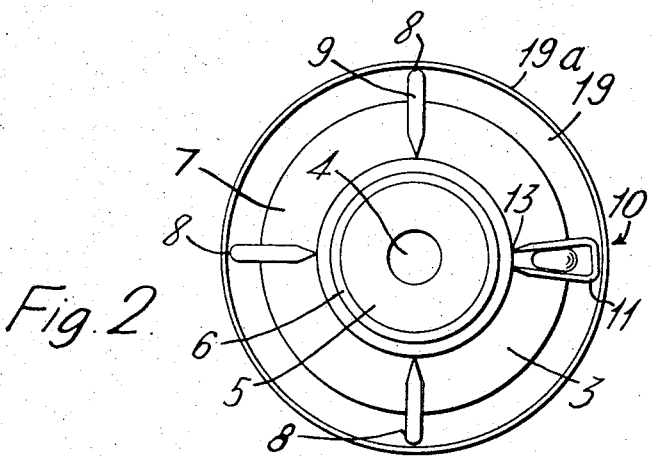

One preferred form of the invention will now be described with reference to the accompanying drawings in which:

FIGURE 1 is a cross-sectional view of the upper portion of the apparatus,

FIGURE 2 is a plan view of the apparatus in FIGURE 1 with the top member removed and the valve mechanism means not shown, FIGURE 3 is a sectional view taken through the apparatus, FIGURE 4 is an elevation of the upper portion of the apparatus taken at right angles to that in FIGURE 3 and with part of the apparatus associated with the valve means shown in section, FIGURE 5 illustrates the valve means for providing communication between the discharge conduit and the collecting chamber, FIGURE 6 shows the valve means for providing communication between the discharge conduit and the top of the gauge glass, FIGURE 7 is an elevation of the lower portion of the apparatus, and FIGURE 8 is a view partly in elevation and partly in section taken at right angles to the elevation shown in FIGURE 7.

In the preferred form of the invention measuring apparatus for use with milking machines for measuring and indicating the milk yield is constructed as follows. A delivery conduit 1 centrally supported in the apparatus has lower end 2 connectable to the milk supply from the teat cups. A head member 3 is supported extending radially outwardly from adjacent outlet 4 from the conduit 1.

The upper surface of the head member 3 is shaped as a frustro-conical dished portion 5 about the outlet 4 with a lip 6 directed outwardly from the top of the dished portion 5 in a plane substantially normal to the longitudinal axis of the delivery conduit. The remaining portion of the head member is sloped away to form the top surface of a skirt 7.

Three supporting pillars 8 project from the top surface of the skirt 7 at spaced intervals of approximately ninety degrees. The top face 9 of each pillar 8 is positioned in a plane slightly above the plane in which the lip 6 is positioned.

A collecting passageway 10 also extends from the top surface of the skirt 7 and is symmetrically arranged with respect to the pillars 8. The collecting passageway is formed by a substantially U-shaped collecting wall 11 having the top 12 of the wall in the same plane as the top 9 of the pillars 8. The entrance 13 into the U-shaped collecting wall 11 is directed inwardly towards the center of the outlet 4 with the free edges of the arms defining the entrance, sharpened to a knife-edge to minimize resistance in the flow of milk. A conduit 14 directs the milk collected by the collecting wall 11 through the skirt 7 and into a sample chamber 15.

The sample chamber 15 comprises a cylindrical chamber defined by a wall 15a concentrically supported about the delivery conduit 1 with base 16 sealably engaged with a threaded boss 17 by a nut 18.

A collecting chamber 19 is defined by a wall 19a concentrically positioned about the upper end of the delivery conduit 1 with base 20 fixed to the wall 15a of the sample chamber 15 towards the upper end thereof. The upper end of the wall 19a terminates in a plane slightly below the top face 9 of the pillars 8.

The outer face of the pillars 8 and the base portion of the U-shaped collecting wall 11 project beyond the skirt 7 and are arranged to centralize the head member 3 in the collecting chamber 19.

The collecting passageway 10 is arranged to receive the milk discharged as an annular disc under conditions substantially the same as the flow from the remaining portion of the annular disc is received in the collecting chamber 19, that is the base of the U-shaped wall 11 is positioned as close as is practicable to the wall 19a of the collecting chamber 19.

Also, the collecting chamber 19 must be of a size such that in use the pressure therein is substantially as in the sample chamber. Also, the space between the upper edge of the wall 15a of the sample chamber 15 and the under surface of the head member 3 must be sufficient to allow for a ready flow of air to equalize the vacuum between the sample chamber and the collecting chamber.

A top member 21 is supported on the top faces 9 of the support pillars 8 and the top face 12 of the collecting wall 11. Part of under surface 22 of the top member 21 and the top surface of the head member 3 to the outer edge of the lip 6 form the members defining a space through which the milk is jetted to form a fluctuating but at any instant substantially uniform flow of milk passing from this space as an annular disc, that is a circular jet flung outwardly in a horizontal plane. The frusto-conical dished portion 5 reduces the depth as the circumference thereof increases and is arranged to provide a substantially constant area through any concentric circle from the outlet 4 to the inner edge of the lip 6. The lip 6, in combination with the under surface 22 immediately thereabove provides a constriction through which the milk is finally passed to form the annular disc. In this way, uniform flow conditions are created which ensure a uniform flow of milk is being jetted outwardly.

The top plate 21 is sealably engaged to the wall 19a by a dependent peripheral resilient member 23, thus completing the air-tight chamber 19 when the apparatus is in use.

The collecting passageway 10 has the collecting arms with the entrance thereto arranged to collect a fractional part of the circular jet of milk so that the milk collected by the collecting passageway provides a volume of milk substantially proportional to the total volume of milk flowing during the measuring process. Only the milk collected through the entrance 13 passes via the passageway 14 into the sample chamber 15.

A discharge conduit 24 projects from the apparatus beneath the base 20 of the collecting chamber 19 and is arranged to be connected to the milk line of the milking plant. The conduit 24 communicates with a valve housing 25 having a port 26 communicating with the collecting chamber 19 to provide an outlet therefrom and a further port 27 communicating with the top of a gauge glass 28 to provide an outlet from the sample chamber.

The gauge glass 28 is connected at the lower end to a conduit 29 communicating with the base 16 of the sample chamber 15 and extends between this connection and the connection with the valve housing 25 while being parallel to the longitudinal axis of the delivery conduit 1. A scale 30 is supported beside the gauge glass 28 and is calibrated to indicate the total volume of milk that is passed through the measuring apparatus using the level of the sample in the gauge glass. An equalizer aperture 36 is provided between the port 27 and the chamber 15.

A valve member 31 adjustable in the housing 25 is used in three positions. In the first position shown in FIGURE 5 the discharge conduit 24 is connected to the collecting chamber 19 via the port 26. In the second position shown in FIGURE 4 the delivery conduit 24 is closed thereby shutting off the vacuum from the milking plant. In the third position shown in FIGURE 6 the discharge conduit 24 is connected via the port 27 to the top of the gauge glass 28.

A sample drain 32 is positioned in the base 16 of the sample chamber 15 and has a spout 33 arranged to direct the flow of milk from the drain aperture 32. A spring-loaded rubber ball 34 normally closes the aperture 32 and is mounted with the spring 35 providing a handle allowing the drain aperture to be opened to collect a sample of milk when the valve 31 is in the off position.

A suitable mounting bracket is provided for the apparatus enabling it to be supported in a cow bail with the delivery conduit 1 vertically positioned.

To use the above described invention the milk line to the teat cup is connected to the lower end 2 of the delivery conduit 1, the milk line to the milking plant is connected to the discharge conduit 24 and the valve 31 positioned as indicated in FIGURE 5. The mixture of milk and air sucked through the conduit 1 during the milking of the cow is jetted out through the space between the head member 3 and the top member 21 to form a uniform circular jet in the form of an annular disc as was above described. The collecting wall 11 collects a fractional portion, preferably about two and a half percent, of the total milk flowing and this is passed in the sample chamber 15 with the remaining ninety-seven and a half percent of the milk flowing over the skirt 7 and into the collecting chamber 19 to be sucked through the port 26, valve 31 and out the discharge conduit 24 to the main milk line. When a cow has been milked two and a half percent of the milk will have been collected in the sample chamber 15 and the level in the gauge glass may be read against the scale 30 calibrated to indicate the total milk given by that cow. The equalizer aperture 36 ensures an accurate reading in the gauge glass. At this stage, the valve 31 will be in the off position with the discharge conduit 24 closed. Should the operator desire to take a sample of the milk for example for butter fat testing, he may open the sample drain 32 by pulling on the spring arm 35.

When the reading has been made and the sample has not been taken for testing, the valve 31 is turned so that the discharge conduit 24 communicates with the top of the gauge glass through the port 27. This draws the milk out from the sample chamber 15 ready for the apparatus to be used in measuring the milk given by the next cow to be milked.

When it is desired to wash the apparatus the valve is left in the position providing communication between the discharge conduit and the top of the gauge glass 28. Flushing water passes up the delivery conduit 1 through the metering head into the collecting or main chamber 19 and then overflows into the sample chamber 15 and is drawn through the outlet 29 and gauge glass 28 to pass out through the discharge conduit. It this way the apparatus is easily and effectively flushed out.

In the preferred example above described a gauge glass is provided in association with the sample chamber. It would of course be possible for the sample collected to be drawn off and weighed or the volume thereof measured to obtain the same information. Also, the driving or jetting of the milk under uniform conditions is particularly described with reference to a discharge radially outwardly from the end of the delivery conduit. Other constructions could of course be used provided the uniformity of flow was maintained.

What I claim is:

1. Apparatus for use with milking machines for measuring and indicating the milk yield of a cow, comprising a delivery conduit connectable to the milk supply from a set of teat cups arranged to be substantially vertically supported in use and having an outlet at the upper end thereof, a head member supported extending radially outwardly from said delivery conduit adjacent the outlet therefrom, support pillars projecting from said head member with the upper surface of said support pillars positioned in a plane slightly beyond the plane in which the uppermost surface of said head member is positioned, a top member supportable on said support pillars with part of the under surface thereof and part of the upper surface of said head member extending outwardly from the outlet of the delivery conduit defining a space through which said milk is jetted to form a fluctuating but at any instant a substantially uniform flow of milk passing from said space to form an annular disc, a collecting passageway supported by said head member and having an inlet thereto positioned to collect the milk passing from a fractional part of the flow so that the milk collected by said collecting passageway provides a volume of milk substantially proportional to the total volume of milk flowing during the metering process, a sample chamber calibrated to indicate the total volume of milk passing through said measuring apparatus using said sample flow collected by said collecting passageway with only the outlet from said collecting passageway arranged to deliver milk into said metering chamber, a collecting chamber encompassing said head member with the top thereof provided by the walls sealably engaging said top member, said collecting chamber arranged to collect the remaining flow of milk, a discharge conduit connectable to the milk line of the milking plant and adjustable valve means operable to allow the milk to be removed from said collecting chamber or to be removed from said sample chamber prior to the next operation of the apparatus.

2. Apparatus for use with milking machines for measuring and indicating the milk yield of a cow, comprising a delivery conduit connectable to the milk supply from a set of teat cups arranged to be substantially vertically supported in use and having an outlet at the upper end thereof, a head member extending radially outwardly from said delivery conduit adjacent the outlet therefrom with the upper surface of said head member shaped on a frustro-conical dished portion about said outlet with a lip directed outwardly from the top of said dished portion in a plane substantially normal to the longitudinal axis of said delivery conduit thereafter shaped to form the top of a peripheral skirt, support pillars projecting from said head member with the upper surface of said support pillars positioned in a plane slightly beyond the plane in which the upper surface of the lip portion of said head member, a top member supportable on said support pillars with part of the under surface thereof and part of the upper surface of said head member extending outwardly from the outlet of the delivery conduit defining a space through which said milk is jetted to form a fluctuating but at any instant a substantially uniform flow of milk passing from said space as a circular jet in the form of an annular disc, a collecting passageway supported by said head member and having an inlet thereto positioned to collect the milk passing from a fractional part of the circular jet so that the milk collected by said collecting passageway provides a volume of milk substantially proportional to the total volume of milk flowing during the metering process, a sample chamber positioned to receive milk only from the outlet from said collecting passageway, a collecting chamber encompassing said head member with the top thereof provided by said top plate, outlet means connectable to the milk line of the milking plant and valve means associated with said outlet means and arranged to be positioned to discharge the milk from the collecting chamber during milking and to be positioned to discharge milk from the sample chamber after milking is complete and measurement taken.

3. Apparatus for use with milking machines for measuring and indicating the milk yield, of a cow, comprising a delivery conduit connectable to a milk supply from a set of teat cups arranged to be substantially vertically supported in use and having an outlet at the upper end thereof, a head supported extending radially outwardly from said delivery conduit adjacent the outlet therefrom with the upper surface of said head member shaped as a frustro-conical dished portion about said outlet with a lip directed outwardly from the top of the dished portion in a plane substantially normal to the longitudinal axis of said delivery conduit and thereafter shaped to form the top of a dependent peripheral skirt, three support pillars projecting from the upper surface of said head member at spaced intervals in substantially ninety degrees with the upper surface of the support pillars positioned in a plane slightly beyond the plane in which said lip portion of the upper surface of said head member is positioned, a top member supportable on said support pillars with part of the under surface thereof and the top surface of said head member to the outer edge of said lip defining a space through which the milk is jetted to form a fluctuating but at any instant a substantially uniform flow of milk passing from said space as a circular jet in the form of an annular disc, substantially U-shaped collecting walls supported on said head member with the top of said walls in use positioned in the same plane as the top of said support pillars, the entrance through said collecting wall being positioned to collect the milk passing from a fractional part of the milk flow so that the milk collected by said collecting arms provides a volume of milk substantially proportional to the total volume of milk flowing during the measuring process, a sample chamber concentrically positioned about said delivery conduit with the upper open end positioned beneath said head member, a communicating conduit extending from between said collecting wall to deliver milk into said sample chamber, a gauge glass calibrated to indicate the total volume of milk passing through said measuring apparatus said gauge glass being connected to said sample chamber to measure the level of milk therein, a collecting chamber defined by walls concentrically positioned about the upper end of said delivery conduit, a base attached extending radially from the walls of said sample chamber towards the upper end thereof and said top member arranged to be sealably engaged with said concentric walls, with the outer faces of said support pillars and the base of said U-shaped collecting wall arranged to centralize said head member in said collecting chamber, a discharge conduit connectable with the milk line of a milking plant, a valve seat having port communicating with the top of said gauge glass, and a further port communicating with said collecting chamber and an adjustable valve member operable in said valve seat in one position to connect said discharge conduit to said collecting chamber, in a further position to connect said discharge conduit to the top of said gauge glass and in a third position to close said discharge conduit, and a sample drain adjacent the base of said sample chamber to allow a sample of milk to be removed for testing when the discharge conduit is closed by said valve member.

References Cited

UNITED STATES PATENTS

| | | | |
|---|---|---|---|
| 1,121,246 | 12/1914 | Hinman et al. | 73—421 X |
| 3,045,493 | 7/1962 | Seaborne | 73—202 X |
| 3,102,424 | 9/1963 | Basham et al. | 73—202 |
| 3,272,010 | 9/1966 | Johnson | 73—202 |

RICHARD C. QUEISSER, *Primary Examiner.*

JAMES J. GILL, *Examiner.*

EDWARD D. GILHOOLY, *Assistant Examiner.*